(12) United States Patent
Brenner et al.

(10) Patent No.: US 11,473,561 B2
(45) Date of Patent: Oct. 18, 2022

(54) GENERATOR FOR A WIND TURBINE, AND WIND TURBINE HAVING SAME

(71) Applicant: Wobben Properties GmbH, Aurich (DE)

(72) Inventors: Albrecht Brenner, Aurich (DE); Jochen Röer, Ganderkesee (DE); Jan Carsten Ziems, Aurich (DE)

(73) Assignee: Wobben Properties GmbH, Aurich (DE)

(*) Notice: Subject to any disclaimer, the term of this patent is extended or adjusted under 35 U.S.C. 154(b) by 0 days.

(21) Appl. No.: 16/636,312

(22) PCT Filed: Aug. 8, 2018

(86) PCT No.: PCT/EP2018/071543
§ 371 (c)(1),
(2) Date: Feb. 3, 2020

(87) PCT Pub. No.: WO2019/030300
PCT Pub. Date: Feb. 14, 2019

(65) Prior Publication Data
US 2021/0164444 A1    Jun. 3, 2021

(30) Foreign Application Priority Data

Aug. 8, 2017 (DE) .................... 10 2017 118 010.9

(51) Int. Cl.
*F03D 9/25* (2016.01)
*F03D 15/00* (2016.01)
(Continued)

(52) U.S. Cl.
CPC ............... *F03D 9/25* (2016.05); *F03D 15/00* (2016.05); *H02K 7/003* (2013.01); *H02K 7/116* (2013.01);
(Continued)

(58) Field of Classification Search
CPC ........... F03D 9/25; F03D 15/00; H02K 7/003; H02K 7/116; H02K 7/1838; H02K 49/102;
(Continued)

(56) References Cited

U.S. PATENT DOCUMENTS 6,794,781 B2   9/2004   Razzell et al.
6,911,741 B2   6/2005   Pettersen et al.
(Continued)

FOREIGN PATENT DOCUMENTS

CN    101338733 A    1/2009
CN    102667149 A    9/2012
(Continued)

*Primary Examiner* — Sean Gugger
(74) *Attorney, Agent, or Firm* — Seed Intellectual Property Law Group LLP

(57) ABSTRACT

A generator for a wind turbine comprising a generator stator having a mounting portion for fixing the generator stator to a machine carrier of the wind turbine, and a generator rotor mounted rotatably about a generator axis relative to the generator stator. The generator has a single-stage transmission which is adapted to non-rotatably cooperate at the drive side with a rotor blade hub and which is non-rotatably connected at the output side to the generator rotor.

10 Claims, 3 Drawing Sheets

(51) Int. Cl.
*H02K 7/00* (2006.01)
*H02K 7/116* (2006.01)
*H02K 7/18* (2006.01)
*H02K 49/10* (2006.01)

(52) U.S. Cl.
CPC ......... *H02K 7/1838* (2013.01); *H02K 49/102* (2013.01); *F05B 2220/706* (2013.01); *F05B 2240/21* (2013.01); *F05B 2240/912* (2013.01)

(58) Field of Classification Search
CPC ............ F05B 2220/706; F05B 2240/21; F05B 2240/912
See application file for complete search history.

(56) References Cited

U.S. PATENT DOCUMENTS

| | | | |
|---|---|---|---|
| 7,538,446 B2 | 5/2009 | Bonnet | |
| 8,405,243 B2 | 3/2013 | Siegfriedsen | |
| 9,074,579 B2 | 7/2015 | Miyamoto et al. | |
| 9,206,787 B2 | 12/2015 | Winkelmann | |
| 9,793,777 B2 | 10/2017 | Hofmann et al. | |
| 2004/0108781 A1* | 6/2004 | Razzell | H02K 7/11 310/112 |
| 2010/0164232 A1* | 7/2010 | Siegfriedsen | F03D 15/00 290/55 |
| 2012/0263594 A1* | 10/2012 | Winkelmann | F03D 80/70 416/174 |
| 2012/0294720 A1 | 11/2012 | Smook | |
| 2013/0270832 A1* | 10/2013 | Miyamoto | F03D 9/25 290/54 |
| 2014/0125064 A1* | 5/2014 | Hofmann | H02K 7/09 290/55 |
| 2018/0034356 A1* | 2/2018 | Urch | B60L 50/16 |
| 2019/0186462 A1 | 6/2019 | Mtauweg | |

FOREIGN PATENT DOCUMENTS

| | | |
|---|---|---|
| CN | 103375355 A | 10/2013 |
| DE | 102011011164 A1 | 8/2012 |
| DE | 102011089431 A1 | 6/2013 |
| DE | 102016114184 A1 | 2/2018 |
| EP | 1353436 A2 | 10/2003 |
| JP | 2010521606 A | 6/2010 |
| JP | 2011027050 A | 2/2011 |
| JP | 2011064141 A | 3/2011 |
| JP | 2013221406 A | 10/2013 |
| JP | 2014053979 A | 3/2014 |
| RU | 2280786 C2 | 7/2006 |
| WO | 2011058185 A2 | 5/2011 |
| WO | 2016131078 A1 | 8/2016 |

* cited by examiner

GENERATOR FOR A WIND TURBINE, AND WIND TURBINE HAVING SAME

BACKGROUND

Technical Field

The present invention concerns a generator for a wind turbine comprising a generator stator having a mounting portion for fixing the generator stator to a machine carrier of the wind turbine, and a generator rotor mounted rotatably about a generator axis relative to the generator stator.

Description of the Related Art

Generators of the above-indicated kind are used in wind turbines in many different configurations. On the one hand wind turbines have become established in the state of the art, in which the rotary movement of the rotor blade hub is coupled to the rotor of the generator by means of a multi-stage gear transmission, wherein the multi-stage gear transmission implements a step-up of the drive movement predetermined by the rotor blade hub into a higher rotary speed. The transmissions known from the state of the art exhibit in high loading situations an increased susceptibility to faults and defects. Wind turbines with a drive train having a transmission usually have an asynchronous generator which by virtue of the principle involved requires high rotary speeds. Wind turbines with transmissions are typically designed in such a way that the hub is non-rotatably connected at the drive output side to the main shaft leading to the transmission. The main shaft not only transmits the drive moment of the wind turbine but also the vibration and loadings resulting from the wind, turbulence effects, dynamics and the inherent weight of the hub. Being a rotating component the main shaft is thereby exposed to considerable fluctuating loadings and is to be appropriately dimensioned.

In comparison gear-less wind turbines in particular from the present applicant have gained acceptance in the state of the art, using a slowly rotating, multi-pole synchronous generator. Gear-less turbines are typically mounted directly within the hub on a stationary journal whereby external loadings are diverted into the tower by way of generally stationary structural elements.

Slowly rotating multi-pole synchronous generators are maintenance-friendly and reliable, but due to the principle involved require large generator diameters in order nonetheless to be able to guarantee adequate electric power generation by virtue of the low rotary speeds. By virtue of the trend towards ever increasing power classes markedly above 4 MW (Megawatts) there is a need for improvement in that respect.

BRIEF SUMMARY

Provided are improvements to a generator of the kind set forth in the opening part of this specification. Provided is a generator which can be of the smallest possible dimensions in relation to the power yield. In addition the invention sought to provide that as far as possible the efficiency in terms of generating electrical energy should not be adversely affected.

Provided is a generator having a single-stage transmission which is adapted to non-rotatably cooperate at the drive side with a rotor blade hub of the wind turbine and which is non-rotatably connected at the output side to the generator rotor. By using a single-stage transmission, it is possible to achieve an increase in the rotary speed of the generator rotor relative to the rotary speed of the rotor blade hub without having to forsake the other advantages of the directly driven generator, more specifically the high robustness and the possibility of using a slowly rotating multi-pole synchronous generator. Placement of the single-stage transmission directly at the generator also represents a significant improvement over conventional wind turbines with a transmission, which require a considerable structural setup for implementing the transmission beside the generator and require a comparatively great expansion of the pod of the wind turbine in the direction of the axis of rotation. The single-stage transmission requires only minimum structural space in the direction of the axis of rotation of the generator. In addition implementation of the single-stage transmission in the generator permits a paradigm change. Hitherto in particular slowly rotating synchronous generators were operated exclusively without a transmission, in the state of the art the idea of providing a transmission on wind turbines with a synchronous generator, in particular with a slowly rotating synchronous generator, was even rejected in principle, because that was not necessary.

It has however surprisingly been found that by selecting an only single-stage transmission which entails only a manageable and straight forward change in transmission, it is possible to increase efficiency in respect of generation of electric power. In comparison with conventional wind turbines it is possible to operate smaller generator sizes with the generator structure, by virtue of the transmission ratio of the single-stage transmission, at a higher speed of rotation. That means that, in comparison with the conventional installations of a given power class, smaller generators of significantly lighter structure can now be used in the wind turbine for the same power class while the advantages of the gear-less drive train are substantially retained.

The single-stage transmission is preferably a step-up transmission with a step-up ratio in a range of 1:1.5 to 1:10. In a preferred development single-stage transmission is in the form of a planetary transmission which has a sun gear, a planet carrier having a number of planet gears and a ring gear, wherein the planet gears are in engagement with the sun gear and with the ring gear. Preferably the planetary transmission has two or more planet gears, particularly preferably three planet gears.

What is viewed as a particular advantage of the planetary transmission is that it combines a high level of robustness and a small structural space, in particular in the axial direction (with respect to the axis of rotation of the generator). The frictional losses of the planetary transmission are moderate so that a deterioration in the overall degree of efficiency of the wind turbine in regard to the generation of electric power can be compensated by the use of the planetary transmission by the increase in power generation by virtue of the higher rotary speed.

In a preferred embodiment the planet carrier is non-rotatably connected at the drive side to the rotor blade hub.

In a further preferred configuration the generator has a hollow generator shaft on which the generator rotor is fixed. Preferably the hollow shaft is non-rotatably connected to the sun gear.

Preferably the above-described mounting portion is a first mounting portion and the generator further has a second mounting portion which is arranged in opposite relationship with the first mounting portion in the direction of the generator axis for non-rotatable connection to a journal of the wind turbine. The journal is preferably adapted to carry the rotor blade hub. In this embodiment the generator is adapted to be arranged on the same side of the wind turbine tower as the rotor blade hub.

Preferably the planet carrier and the rotor blade hub are connected by means of a coupling switchable selectively into a coupled and an uncoupled state, wherein in the coupled state a non-rotatable connection is made between the single-stage transmission and the rotor blade hub and in the uncoupled state there is relative rotatability of the rotor blade hub relative to the generator rotor.

Arranging the rotor blade hub and the generator in the direct vicinity of each other gives the advantage that direct connection of the rotor blade hub to the single-stage transmission of the generator is possible.

According to an alternative preferred embodiment the generator is adapted to be arranged in opposite relationship to the rotor blade hub on the tower of the wind turbine. For that purpose it is preferred if the generator has a generator housing and a main shaft mounted to the generator housing, wherein the main shaft is adapted to be non-rotatably connected to the rotor blade hub, is passed through the hollow generator shaft and is mounted coaxially relative thereto, and wherein the planet carrier is non-rotatably connected to the main shaft.

The foregoing parts of the description relate to a use of a planetary transmission in the form of a single-stage transmission. However, the single-stage transmission can preferably be implemented by means of a magnetic transmission. In a further preferred embodiment accordingly the single-stage transmission is in the form of a magnetic transmission which instead of the sun gear has an inner permanent-magnetic ring, instead of the planet carrier it has a ferromagnetic intermediate ring and instead of the ring gear it has an outer permanent-magnetic ring.

The invention has been described hereinbefore with reference to a first aspect in relation to the generator of the wind turbine. In a second aspect provided is a wind turbine of the kind set forth in the opening part of this specification insofar as the wind turbine has a rotor blade hub, a tower, a machine carrier mounted rotatably to the tower and having a mounting portion for receiving a generator, and a generator fixed to the machine carrier by means of a corresponding mounting portion for generating electric power, wherein the generator is designed in accordance with one of the above-described preferred embodiments.

In accordance with a first preferred alternative the generator is arranged on a first side of the machine carrier and the rotor blade hub is arranged on a second side of the machine carrier, that is opposite to the generator.

Particularly preferably the drive torque which is introduced into the wind turbine by the rotor blade hub is transmitted to the generator by means of a main shaft, the main shaft being passed through a hollow shaft of the generator.

In a preferred alternative the generator and the rotor blade hub are arranged on the same side of the machine carrier, wherein particularly preferably a journal which carries the rotor blade hub is connected to the generator or to a structure carrying the generator.

In that case then preferably the generator is fixed by means of the first mounting portion to a corresponding mounting portion of the machine carrier and the rotor blade hub is fixed to the second mounting portion of the generator by means of the journal which has a corresponding mounting portion.

The generator used in the wind turbine is preferably in the form of a synchronous generator, particularly preferably in the form of a multi-pole synchronous generator, in particular in the form of a slowly rotating multi-pole synchronous generator. Particular preferably the generator is a ring generator.

Particularly preferably the single-stage transmission of the generator is in the form of an ancillary transmission and is mounted at a side of the generator that is remote from the machine carrier. That achieves particularly easy accessibility to the transmission for maintenance purposes.

The term slowly rotating generator is used to denote a generator which rotates at a speed of revolution of 100 revolutions per minute or fewer.

The term multi-pole generator is used to denote a generator having at least 48, 96, in particular at least 192 rotor poles.

The term ring generator is used to mean that the magnetically active regions of the rotor and the stator, more specifically in particular the lamination assemblies of the stator and the rotor, are arranged in an annular region around the air gap which separates the rotor and the stator from each other. "Rotor" is here synonymous for the generator rotor.

The generator is preferably free from magnetically operative regions in an inner region of a radius of at least 50% of the mean air gap radius.

A ring generator can also be defined in that the radial thickness of the magnetically active parts or, in other words, the magnetically active region, namely the radial thickness from the inner edge of the pole wheel to the outer edge of the stator, or from the inner edge of the stator to the outer edge of the rotor, in the case of an external rotor, is less than the air gap radius, in particular the radial thickness of the magnetically active region of the generator is less than 30%, in particular less than 25% of the air gap radius. In addition or alternatively ring generators can be defined in that the depth, namely the axial orientation of the generator in the direction of the axis of rotation, is less than the air gap radius, and in particular the depth is less than 30%, in particular less than 25% of the air gap radius, in which respect the respective mean pitch circle of the air gap is meant.

BRIEF DESCRIPTION OF THE SEVERAL VIEWS OF THE DRAWINGS

The invention is described in greater detail hereinafter by means of two preferred embodiments with reference to the accompanying Figures in which.

DETAILED DESCRIPTION

Figure 1:
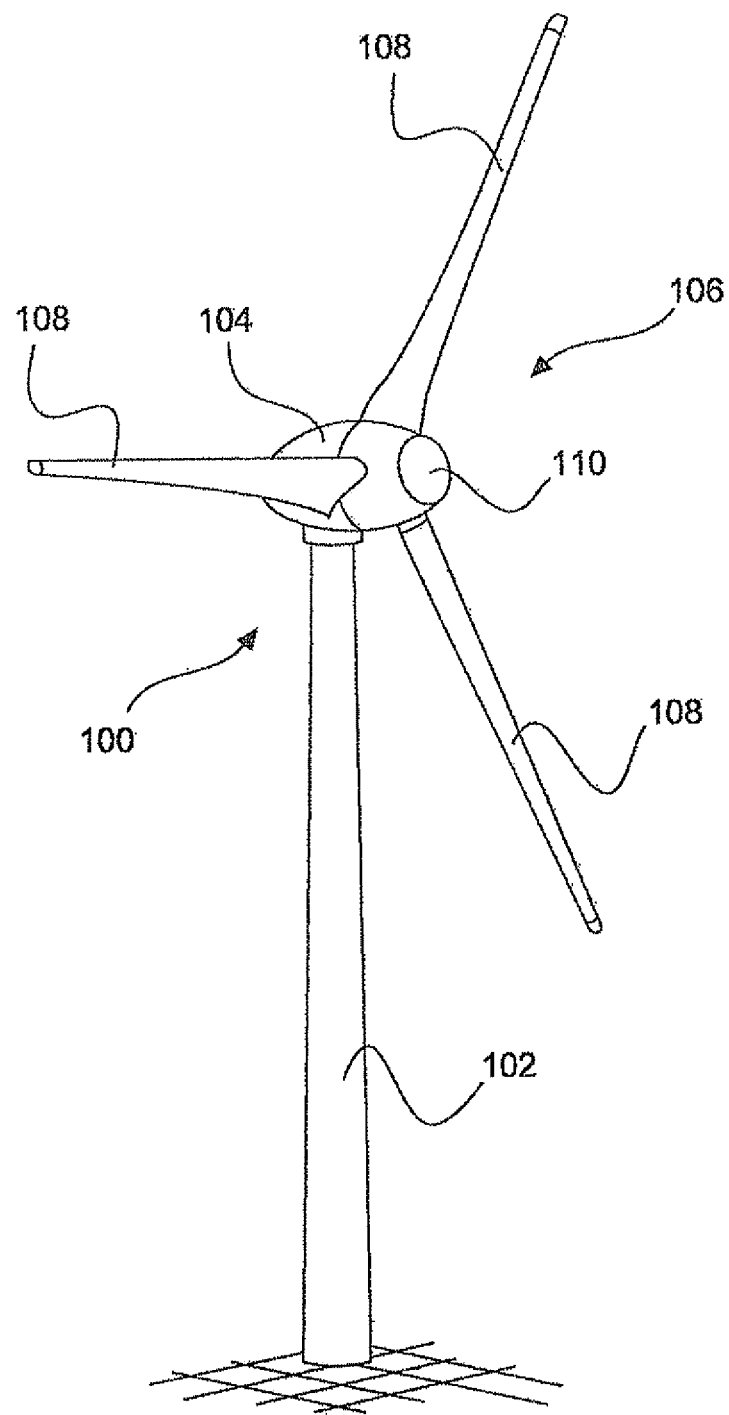
FIG. 1 shows a diagrammatic perspective view of a wind turbine according to the invention.

FIG. 1 shows a diagrammatic view of a wind turbine 100 according to the invention. The wind turbine 100 has a tower 102 and a pod 104 on the tower 102. Provided on the pod is an aerodynamic rotor 106 having three rotor blades 108 and a spinner 110. The aerodynamic rotor 106 is driven in rotation in operation of the wind turbine 100 by the wind and thus drives a generator 1 (FIG. 2) coupled directly or indirectly to the aerodynamic rotor 106. The electric generator 1 is arranged in the pod 104 and generates electric power.

Figure 2:
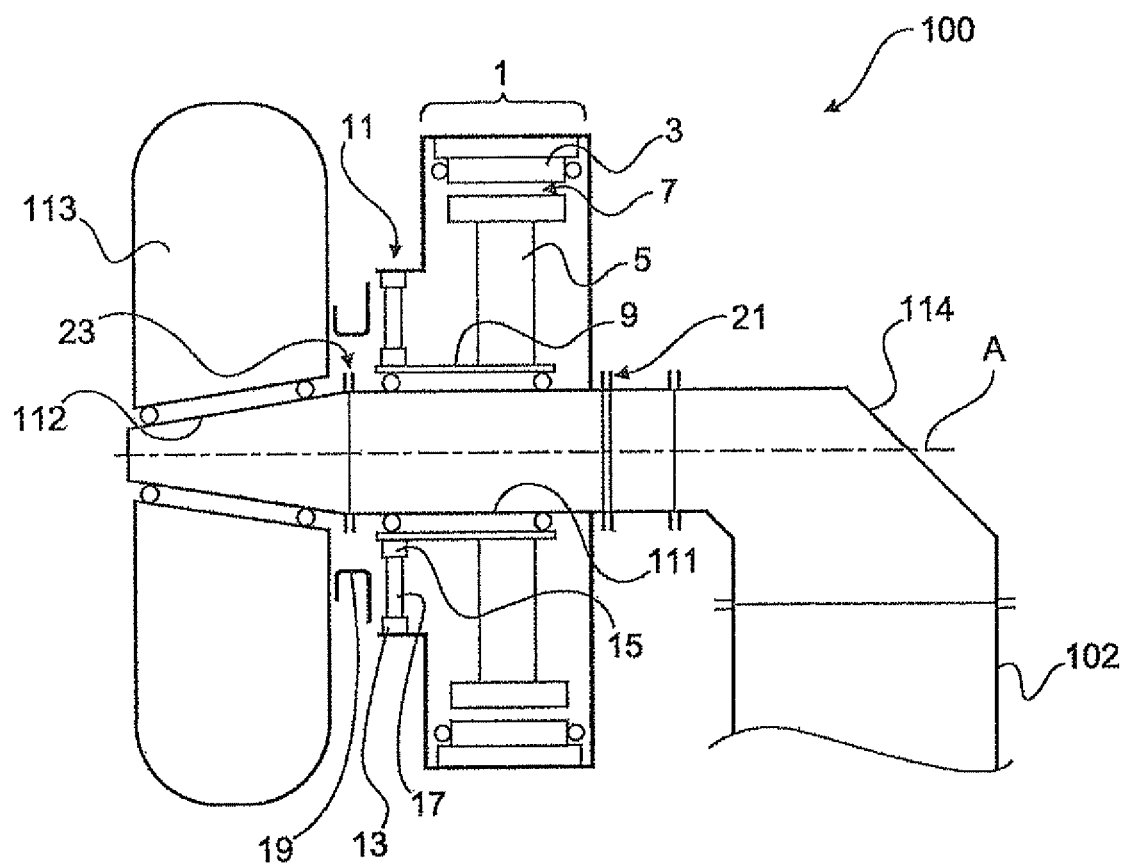
FIG. 2 shows a diagrammatic cross-sectional view through the pod of the wind turbine of FIG. 1 in a first embodiment.

FIG. 2 diagrammatically shows the internals of the pod 104 in accordance with a first embodiment. The rotor blades 108 shown in FIG. 1 are not shown here for the sake of simplicity of the drawing.

The generator 1 of the wind turbine 100 has a stator 3 and a generator rotor 5 mounted rotatably relative to the stator 3. There is an air gap 7 between the generator rotor 5 and the stator 3.

The generator rotor 5 is connected non-rotatably to a single-stage transmission 11 by means of a generator shaft 9 and in particular the generator rotor 5 is non-rotatably connected to a sun gear 15. The stator 3 is preferably non-rotatably connected to a ring gear 13 of the single-stage transmission 11.

The single-stage transmission 11 further has a number of planet gears which are arranged on a planet carrier 17 and wherein the planet carrier 17 is connected to the rotor blade hub 113 by means of a coupling 19. Consequently the rotational movement of the rotor blade hub 113 is transmitted to the generator 5 rotor by means of the planet carrier 17 of the single-stage transmission, in which case, by virtue of the stationary hollow gear 13 non-rotatably connected to the stator, the rotary movement of the rotor blade hub 113 is stepped up to the sun gear 15 so that the generator shaft 9 and thus the generator rotor 5 rotate more rapidly than the rotor blade hub 113.

The generator 1 has a first mounting portion 21 to which the generator 1 is directly or indirectly fixed at a machine carrier 114. The mounting portion 21 is preferably in the form of a flange portion.

The machine carrier 114 is in turn fixed to the tower 102 of the wind turbine, preferably by means of a rotary connection. The generator 1 and the rotor blade hub 113 are preferably arranged coaxially with a generator axis A.

The rotor blade hub 113 is preferably mounted on a journal 112, wherein the rotor blade hub 113 or the journal 112 are fixed by means of a second mounting portion 23 (preferably in the form of a flange portion) to the generator 1, consequently being arranged on the same side of the machine carrier 114 of a wind turbine 100.

Figure 3:
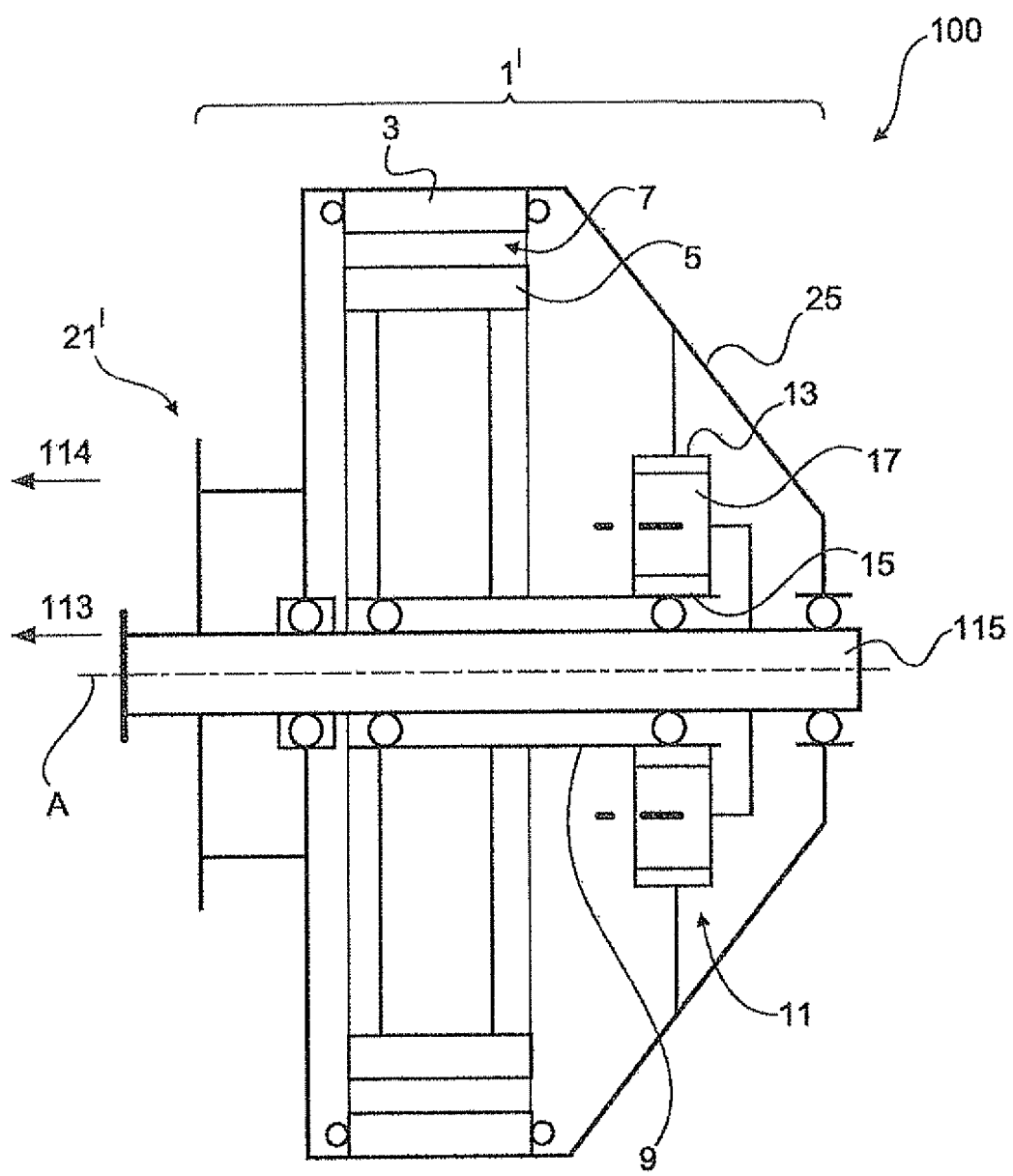
FIG. 3 shows a diagrammatic cross-sectional view through a pod of the wind turbine in FIG. 1 in a second embodiment.

FIG. 3 shows a generator arrangement according to a second preferred embodiment. FIG. 3 shows a generator 1' which unlike the generator shown in FIG. 2 does not have two mounting portions but only a single mounting portion 21' or preferably in the form of a flange portion, by means of which the generator 1' is connected to the machine carrier 114 of the wind turbine 100. Unlike the generator 1 of FIG. 2 the generator 1' is not arranged on the same side relative to the machine carrier 114 as the rotor blade hub 113 but is fixed to the machine carrier 114 on a side of the rotor blade hub 113, that is opposite relative to the machine carrier 114, so that the tilting moments occurring due to the inherent weights of the rotor blade hub and the generator 1' on the tower 102 are at least partially compensated.

The generator 1' like the generator 1 of FIG. 2 has a stator 3, a rotor 5 and an interposed air gap 7.

The generator rotor 5 is non-rotatably connected to the sun gear 15 of the single-stage transmission by means of a generator shaft 9 while the stator 3 is non-rotatably connected to the ring gear 13 of the single-stage transmission 11. The planet carrier 17 with its number of planet gears in turn provides for step-up transmission of the rotational movement of the rotor blade hub 113 to the generator rotor 5 (identical in system terms to the embodiment of FIG. 2).

Unlike FIG. 2 the rotor blade hub 113 however is not coupled directly to the planet carrier 17 but by way of a main shaft 115 which is passed through the generator shaft 9 in the form of a hollow shaft. In the arrangement shown in FIG. 3 the single-stage transmission 11 is equally in the form of a planetary transmission, but arranged in the form of a reducing transmission on a side remote from the machine carrier 114 and a side remote from the rotor blade hub 113 so that optionally, if suitable openings are provided in the generator housing 25, it is accessible from the exterior without having to touch the rotor blade hub 113.

The invention claimed is:

1. A wind turbine, comprising:
    a rotor blade hub,
    a tower,
    a generator,
    a machine carrier, mounted rotatably to the tower and having a first mounting portion for receiving the generator, and
    the generator coupled to the rotor blade hub at a first side of the generator, the generator comprising:
        a generator housing;
        a rotatable main shaft mounted to the generator housing;
        a rotatable hollow generator shaft, wherein the rotatable main shaft is configured to transmit a drive moment from the rotor blade hub to the generator and is passed through the hollow generator shaft and is mounted coaxially with respect the rotatable hollow generator shaft;
        a generator stator having a first side, the first side having a second mounting portion for fixing the generator stator to the machine carrier of the wind turbine, the generator stator further having a second side opposite the first side; and
        a generator rotor mounted rotatably about a generator axis and relative to the generator stator,
    wherein the generator has a single-stage transmission having a drive side and an output side, wherein the single-stage transmission is non-rotatably connected at the output side to the generator rotor, wherein the single-stage transmission is configured to non-rotatably cooperate at the drive side with the rotor blade hub,
    wherein the single-stage transmission of the generator is an ancillary transmission and is mounted at a second side that is opposite from the first side of the generator at which the rotor blade hub is arranged,
    wherein the generator rotor is fixed to the hollow generator shaft, and
    wherein the rotatable main shaft is configured to be non-rotatably connected to the rotor blade hub.

2. The wind turbine according to claim 1 wherein the single-stage transmission of the generator is a planetary transmission having a sun gear, a planet carrier having a plurality of planet gears, and a ring gear, wherein the plurality of planet gears are engaged with the sun gear and with the ring gear.

3. The wind turbine according to claim 2 wherein the sun gear is non-rotatably connected at the output side to the generator rotor.

4. The wind turbine according to claim 2 wherein the planet carrier is non-rotatably connected at the drive side to the rotor blade hub.

5. The wind turbine according to claim 2 wherein the planet carrier is non-rotatably connected to the main shaft.

6. The wind turbine according to claim 2 wherein the single-stage transmission is a magnetic transmission having an inner permanent-magnetic ring, a ferromagnetic intermediate ring, and an outer permanent-magnetic ring.

7. The wind turbine according to claim 1 wherein the generator is arranged on a first side of the machine carrier and the rotor blade hub is arranged on a second side of the machine carrier that is opposite to the first side.

8. The wind turbine according to claim 1 wherein the rotor blade hub and the generator are arranged on a same side of the machine carrier.

9. The wind turbine according to claim 8 wherein the second mounting portion of the first side of the generator stator is fixed to the first mounting portion of the machine carrier, and wherein the rotor blade hub is fixed to a third mounting portion of the generator by a journal having a fourth mounting portion.

10. The wind turbine according to claim 1 wherein the generator is a synchronous generator.

* * * * *